May 29, 1956     C. G. BACON ET AL     2,747,964
MANUFACTURE OF POLYMERIC PHOSPHATES
Filed May 27, 1953     2 Sheets—Sheet 1

Inventors
Cyril Godfrey Bacon
David Friend
By Mason & Bateman
Attorneys

May 29, 1956  C. G. BACON ET AL  2,747,964
MANUFACTURE OF POLYMERIC PHOSPHATES
Filed May 27, 1953  2 Sheets-Sheet 2

United States Patent Office 2,747,964  
Patented May 29, 1956

2,747,964

MANUFACTURE OF POLYMERIC PHOSPHATES

Cyril Godfray Bacon, Ufford, near Woodbridge, and David Friend, Trimley St. Martin, near Ipswich, England, assignors to Fisons Limited, Felixstowe, Suffolk, England Application March 27, 1953, Serial No. 344,948

Claims priority, application Great Britain April 2, 1952

5 Claims. (Cl. 23—107)

This invention relates to the production of condensed phosphates, more particularly sodium triployphosphate in polymeric form having the desired solubility characteristics, and has for its object to provide an improved process which will yield a product of higher purity and better physical properties than has been obtainable hitherto, and which will be simple and economic in operation.

It has previously been proposed to manufacture sodium tripolyphosphate by mixing in suitable proportions solutions of disodium phosphate and monosodium phosphate or solutions of similar salts in the ratios necessary to give the desired final product, and to flash dry the divided solution and heat the resulting product in the same rotary furnace in order to complete the reaction of the admixed materials to form sodium tripolyphosphate.

Alternatively, it has been proposed to dry the solution, for example, on a drum drier, followed by heat treatment in a separate furnace or kiln. Another process utilises high-temperature kilning; with fusion, of a mixture of mono and di-sodium phosphates.

It has been found that the processes referred to above present a number of disadvantages which the invention seeks to avoid. The fusion process, while having the merit of achieving good admixture, produces only the less-desirable monomeric form of sodium tripolyphosphate. When so-called flash drying of the solution by spraying the latter into a rotary furnace is practised, it is found that drying is not always complete before the spray of solution reaches the base of the rotary furnace on which it accumulates in a bed; as a result the bed is in a more or less moist condition and the particles formed by the flash drying tend to agglomerate, causing the drying to proceed relatively slowly, so that a significant segregation of the mono and di-sodium phosphates occurs with consequent formation of undesirable condensed phosphates as a by-product, such as for example, pyrophosphate. Even on a drum drier sufficient segregation occurs to produce significant amounts of pyro- and metaphosphates.

The operation of a rotary furnace also presents a number of economic disadvantages since the gases leaving the furnace have to be at a temperature of approximately 350° C. This involves the wastage of a considerable amount of heat and in addition it is found that the waste gases of the furnace entrain a considerable proportion of finely divided tripolyphosphate.

One object of the invention is to improve the economy of operation by utilising the waste heat from the final stage of the process and to avoid or counteract, without increasing the cost of operation of the process, the wastage of the final product caused by entrainment with the waste gases.

In current qualities of marketed sodium tripolyphosphates the metaphosphate may be as high as 3% and the pyrophosphate as high as 5% or even 6%. The desirable quality, which the present invention seeks to achieve, is an eminently soluble product wherein the undesirable proportions of meta- and pyrophosphates do not greatly exceed 1% and whilst this latter percentage is partly obtained by correctly proportioning the necessary raw materials, it is mainly due to the new methods of drying wherein this operation is conducted, there being two distinct stages each employing a differing vessel and heat treatments.

Another object of the present invention is to provide, by spray drying, an intimate mixture of the mono and di-sodium phosphates, in the correct proportions, under conditions which preclude agglomeration prior to kilning and hence which lead to production of a polymeric product substantially free from meta and pyrophosphates, in a time substantially shorter than in known processes.

According to the invention there is provided a process for the manufacture of sodium tripolyphosphate which consists essentially in neutralising wet-process phosphoric acid with soda ash to produce monosodium phosphate, filtering the liquid mixture to remove impurities, dividing the filtrate into two parts substantially in the ratio of 2:1, neutralising the larger part of the filtrate to form di-sodium phosphate, mixing the di-sodium phosphate solution with the remaining one part of the monosodium phosphate solution to produce a mixed solution in which the constituents are in the ratio of two molecules of di-sodium phosphate to one molecule of mono-sodium phosphate, clarifying the solution by filtration if so desired, spray drying said mixed solution, and heating the resultant dried material in a separate kiln to convert it to sodium tripolyphosphate which may then be cooled and if desired ground.

According to a further feature of the invention the hot gases employed in kilning the dried material are used to carry out the preliminary drying of the mixed solution in a spray dryer, the tripolyphosphate entrained in the waste gases in the final stage of the process being thereby recovered.

The reactions involved in the stages of the process are as follows:

1. $3Na_2CO_3 + 6H_3PO_4 = 6NaH_2PO_4 + 3CO_2 + 3H_2O$

2. $6NaH_2PO_4 + 4NaOH = 4Na_2HPO_4 + 2NaH_2PO_4 + 4H_2O$, or

2a. $6NaH_2PO_4 + 2Na_2CO_3 = 4Na_2HPO_4 + 2NaH_2PO_4 + 2H_2O + 2CO_2$

3. $4Na_2HPO_4 + 2NaH_2PO_4 = 2Na_5P_3O_{10} + 4H_2O$

It will be understood in this specification that the term "sodium tripolyphosphate" also covers its polymers which, without detriment to its utilization, occur in the final stage of heat treatment.

Reference will now be made to the accompanying drawings which illustrate diagrammatically the operation of the process according to a preferred form of the invention and in which.

Figure 1:
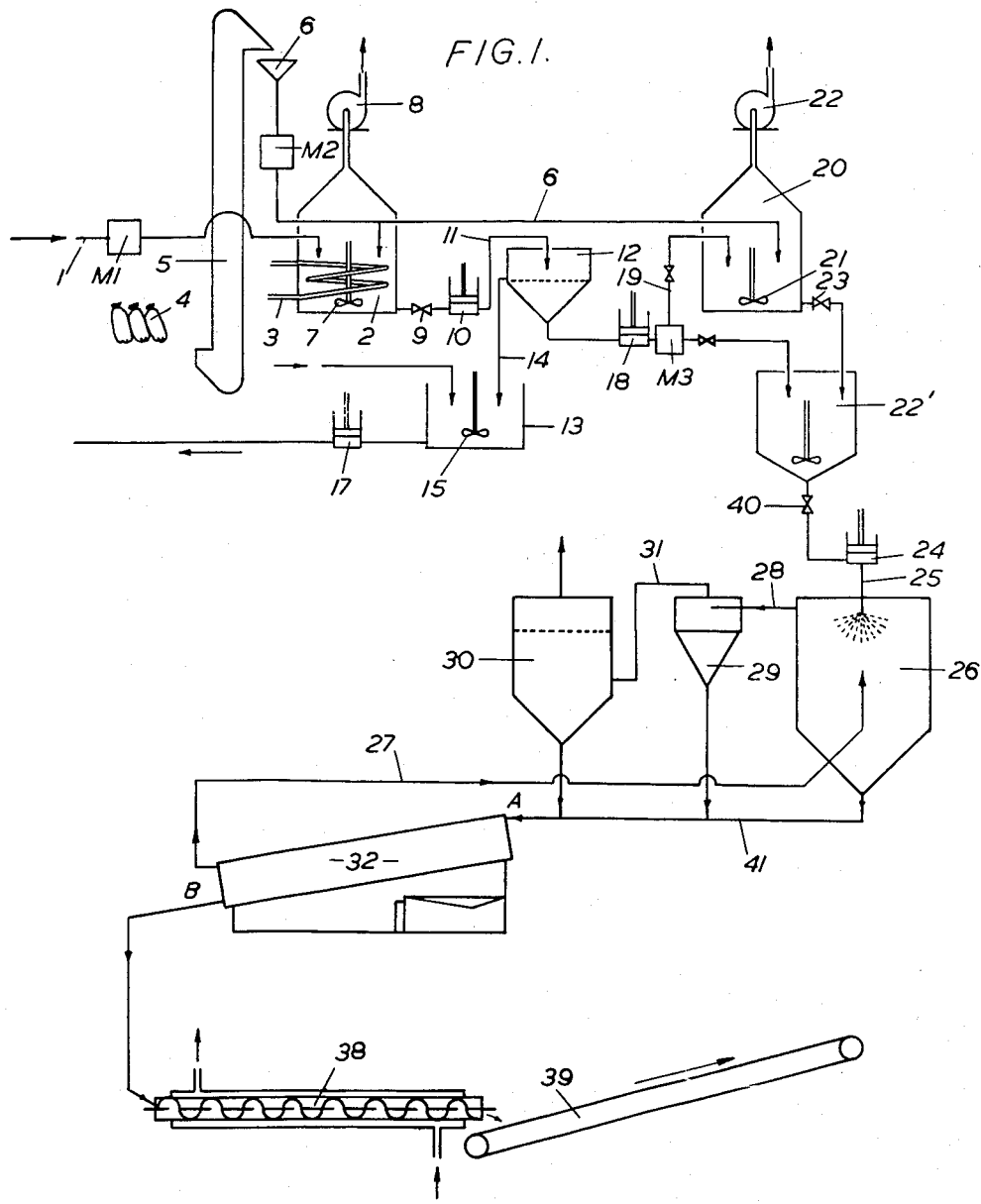
Fig. 1 is a flow sheet diagram of the various stages in the process.
Figure 2:
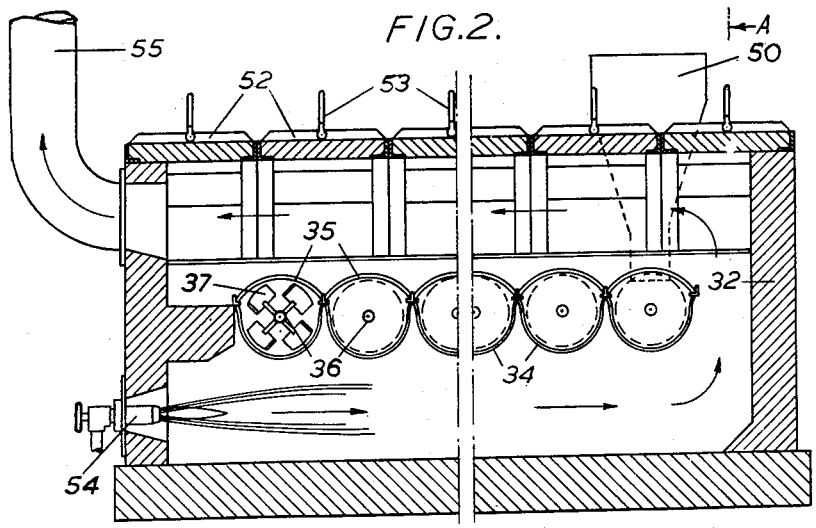
Fig. 2 is a diagrammatic detail view showing the construction of the heating apparatus or kiln employed in the final stages of the process.
Figure 3:
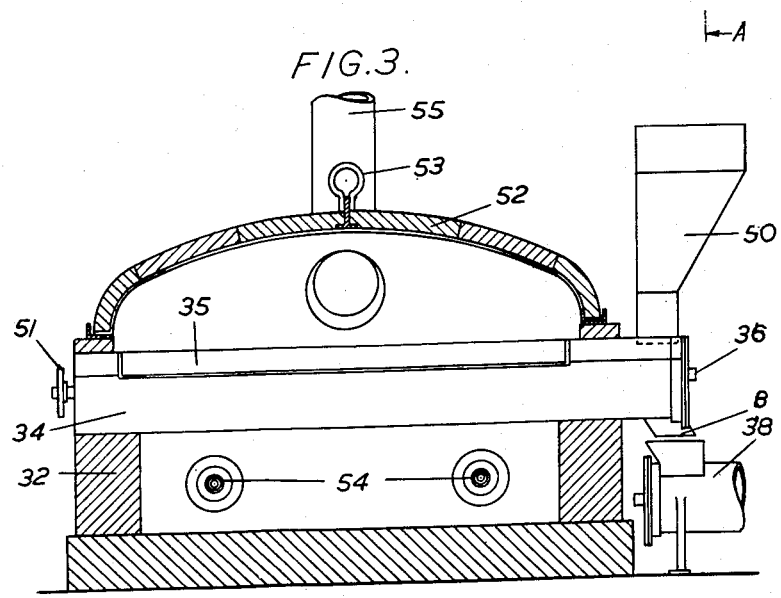
Fig. 3 is a section of Fig. 2 on line A—A.
Figure 4:
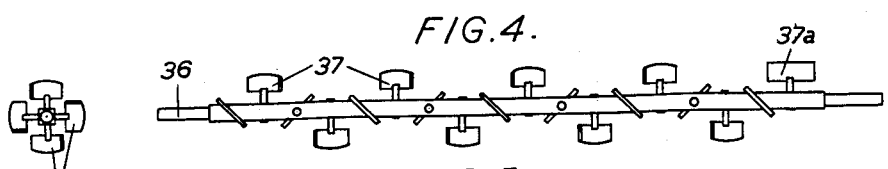
Fig. 4 shows details of the inclined paddles.
Figure 5:
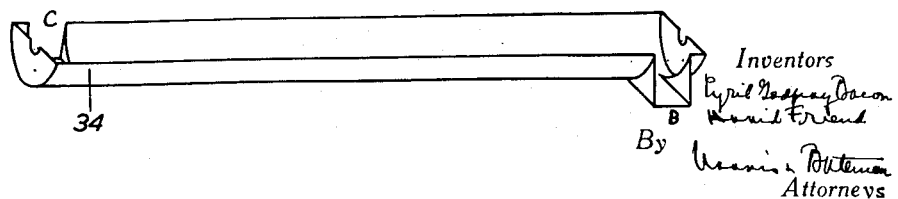
Fig. 5 is a diagrammatic view of one of the kiln troughs showing inlet and discharge openings.

In carrying the invention into effect according to a preferred embodiment thereof phosphoric acid obtained by the wet process and containing about 30% of phosphorus pentoxide ($P_2O_5$) is delivered through line 1 and a metering device M.1 into a vessel 2 which is heated for example by a steam coil 3. Alternatively, heating may be carried out by the employment of a steam jacket, direct injection of steam or a combination of any of these means. Soda ash indicated at 4 is delivered by an elevator 5 for discharge via 6 (which may be a conveyor belt or a chute, for example) and a metering device M.2 into the vessel 2, the soda ash and phosphoric acid being mixed by means of a mechanical stirrer 7. During this stage the soda ash added is slightly in excess of that needed for the conversion of the phosphoric acid to the monosodium salt, the final pH value being 4.3 to 4.5 and the final temperature approximately 85° C. This ensures that practically all the impurities in the liquid mixture will be precipitated in a readily filtrable form.

Carbon dioxide evolved during this stage of the reaction is exhausted from the top of the vessel 2 by means of a fan 8.

From the base of the vessel 2 the liquor passes by way of a valve 9 and pump 10 through line 11 into a filter 12 where the impurities are removed from the liquor and are discharged into a further vessel 13 through line 14 where they may be mixed by means of a stirrer 15 with water through line 16 and returned by means of pump 17 for use elsewhere or to waste. The filtrate from the filter 12 is delivered by means of a pump 18 through line 19 into a further vessel 20 provided with a stirrer 21 and a fan 22 for exhausting any carbon dioxide evolved during this stage. Soda ash is delivered into the vessel 20 through line 6 (or alternatively caustic soda is delivered through a separate device) and the control of the supply of soda ash or caustic soda and the delivery of the filtered liquid by the pump 18 is regulated through meter M.3 so that first of all two parts of the filtrate are neutralised completely in vessel 20 to the disodium phosphate stage under pH control and then this neutralised liquor is delivered to vessel 22′ through valve 23 and is mixed there with the remaining one part of filtrate (i. e. the partially neutralised mono-phosphate liquor from the filter 12), the mixture being thoroughly stirred.

The liquor mixture in the vessel 22′, containing disodium and monosodium phosphate in the desired ratio of 2:1 is then delivered by way of valve 40 and pump 24 through line 25 into a spray dryer 26 into which hot gases are injected through line 27. The spray dryer is preferably arranged to operate with hot gases entering at a temperature in the region of 450° C. and exhaust gases leaving at a temperature in the region of 150° C. the liquor enters the dryer as a fine spray and after passage therethrough in the atmosphere of hot gases is converted into a light powder which consists of a very intimate mixture of mono and disodium phosphates in the correct proportions. It will be understood that the dryer can operate with a wider temperature range than that stated above. The exhaust gases leave the dryer through pipe 28 and monosodium and disodium phosphate powder entrained by the gas is extracted in a cyclone 29 and a bag filter 30 connected to the cyclone by pipe 31. The mixture of mono and disodium phosphate from the vessel 26 passes by way of line 41, together with the further recovered material from the cyclone 29 and bag filter 30, into the heat-treatment unit 32, one preferred form of construction of which is shown in more detail in Figs. 2, 3, 4 and 5.

The heat treatment unit or kiln 32, see Figs. 2, 3, 4 and 5 preferably consists of a furnace provided with a series of troughs 34 fitted with removable covers 35 and shafts 36 carrying adjustable paddle blades 37. The troughs 34 are provided with an inlet opening C and a discharge opening B and the troughs are so arranged that the discharge openings B are connected to the inlet openings C between intermediate troughs 34, the arrangement being such that the powdered mixture of phosphates fed into the first trough by the hopper 50 is moved by the paddle blades 37 along the length of the trough until it reaches the end paddle blade 37a which is set at right angles to the path of travel of the material to effect the discharge from opening B into the inlet opening C of the next trough and so on until the material has traversed the entire length of the furnace 32 and is discharged from the opening B of the final trough to the cooler 38.

The shafts 36 are provided with gears 51 external of the furnace 32 by which they are driven by known means. The furnace 32 is fitted with removable covers 52 formed of fire brick in an angle iron frame each being provided with a lifting eye 53 for easy removal.

The furnace can be gas oil or solid fuel fired and in the example illustrated gas burners 54 provide the necessary heat which, taking the course indicated by the arrows completely encircles the troughs 34 before passing to the flue 55. The trough or troughs 34 is or are heated so that the material will reach a temperature of approximately 350° C. as quickly as possible and the material is maintained at a temperature between 350° C.–450° C. for a period which can be controlled by adjusting the setting of the paddle blades 37 and the speed of rotation of the shaft 36 carrying the paddles. With the employment of spray dried material as in the invention the period during which the latter has to be maintained at a temperature between 350° C. and 450° C. may be as little as 15 minutes. The aforesaid temperature requirements may be conveniently met by burning a suitable fuel in such a way that the resulting products of combustion will have a temperature between approximately 800° C. and 850° C. and will be cooled to about 450° C. during their passage through the flues of the kiln or kilns. Under such conditions it is possible to ensure that the quantity of flue gases required for heating the powdered material is such that the waste gas leaving the heat-treatment unit 32 will provide an adequate quantity of hot gas for delivery to the spray dryer 26 at the temperature required for the operation thereof.

The material delivered from the end of the heat-treatment unit 32 is the finished sodium tripolyphosphate and only requires to be cooled and if necessary ground before being bagged for despatch. For this purpose the material is conveniently delivered from the heat-treatment unit 32 to a rotary water cooled cooling unit 38 and from thence to a band conveyor 39. Instead of the cooling unit 38 shown in Fig. 1 in which cooling is effected by water before the material is passed on to the band conveyor 39 there may conveniently be provided a pneumatic conveyor which will effect the cooling and delivery of the finished product in one operation.

The above described process differs in several respects from the conventional methods for the manufacture of tripolyphosphates and these differences and the resultant advantages are as follows:

The neutralisation of the phosphoric acid in two stages has firstly the advantage that the impurities which are always present in wet process acid are precipitated in a readily filtrable form. Furthermore at a high concentration of $P_2O_5$ the liquid to be filtered has not the high viscosity of a solution which contains an appreciable quantity of the disodium salt and therefore filtration is further assisted. Secondly, by the employment of two-stage neutralisation the first stage corresponding to the conversion of all the $P_2O_5$ to monosodium phosphate can be continuously controlled by an electrometric pH determination. There is no simple physical measurement by means of which it is possible to determine the end point of a single stage neutralisation to produce the desired mixture of 2 molecules of disodium phosphate and 1 molecule of monosodium phosphate. The only method of determination is by chemical analysis which although comparatively simple is slow and cannot therefore provide a continuous reading. The division of the solution into the desired proportions in the ratio of 2:1 can be carried out by means of a simple mechanical arrangement such as for example V-notch weirs, variable stroke diaphragm or reciprocating pumps and the like, two parts being diverted to a second neutraliser for neutralisation to the disodium phosphate stage which can again be continuously controlled by electrometric pH determination. Thereafter the correctly controlled partly neutralised and fully neutralised liquors can be readily mixed to produce the desired mixture of monosodium and disodium phosphates in the correct proportions.

A still further advantage of the employment of a two stage neutralisation process resides in the fact that the use of commercial grade soda ash may introduce certain water insoluble impurities. This can be avoided by the employment of caustic soda but it is not economic to use only caustic soda throughout the process. By means of the two stage neutralisation technique the cheaper soda ash can be used for the first stage since the impurities introduced can be filtered off with the matter precipitated from the acid and the other neutralisation stage can be carried out with the more expensive caustic soda if importance is attached to obtaining a final product entirely free from water-insoluble material.

A further distinction between the process according to the invention and that generally employed hitherto lies in the employment of a spray dryer for the recovery of the phosphates from the solution. Such an operation is commonly carried out on a drum dryer or like apparatus but this is found to be less satisfactory than spray drying since the fact that monosodium phosphate has a higher solubility than disodium phosphate results in the disodium salt crystallising first from a solution which is undergoing evaporation. It is found that even in comparatively thin films of solid material from a drum dryer this segregation of the materials is noticeable whilst in other types of dryers the segregation is even more pronounced. By spray drying the solution it is broken up into minute droplets before being dried, so that the amount of segregation which can take place during drying within the confines of each droplet is in effect negligible. The intimacy of admixture is an important factor in the process since heating of either disodium salt or monosodium salt alone will produce pyro or meta phosphate respectively, which are undesirable impurities in sodium tripolyphosphate. It is found that with drum dried material the segregation which occurs is sufficient to produce several per cent of pyro and meta phosphate but on the other hand the intimacy of mixture with a spray dried material obviates this effect and the product after passing through the kiln is practically free of pyro and meta phosphates whilst at the same time the treatment in the kiln is reduced to a comparatively short period of time.

Conventionally the heat-treatment of the materials is carried out in a rotary direct fired kiln. Such as arrangement is undesirable with spray dried material because the entrainment of the very light powder would be excessive. By employing a kiln of the type described in the process according to the invention under Fig. 2 the rapid reaction properties of the material are used to advantage and enable a reduction to be made in the size and cost of the kiln, that employed in the present invention costing rather less than half the price of a conventional kiln for the same duty. The water evolved during heating in the kiln may carry away small amounts of powder but this water vapour can be vented into the main flues without exposing the powder to the full gas stream and, since the design of the kiln permits the use of these flue gases for the direct heating of the spray dryer, any material entrained in this way will be recovered in the spray dryer without the necessity for employing additional cyclones, bag-filters or the like. The final material is already in the form of a fine powder and although some degree of agglomeration may take place during passage through the kiln the degree of grinding required thereafter will be an absolute minimum. If a drum dryer were employed, however, the product would be in the form of very dense flakes which would require a much greater degree of grinding. The final ground material is in the polymeric form and dissolves more rapidly than the polymeric material produced by conventional processes, probably due to the open structure of the product.

We claim:

1. A process for the manufacture of polymeric sodium tripolyphosphate containing less than about 1% of sodium metaphosphates and less than 1% of sodium pyrophosphates, consisting in neutralising phosphoric acid to produce monosodium phosphate, filtering the liquid mixture to remove impurities, dividing the filtrate into a larger and a smaller part, substantially in the ratio of 2 parts of the filtrate to the larger part to 1 part of the filtrate to the smaller part, neutralising the larger part of the filtrate to form disodium phosphate, mixing the disodium phosphate with the remaining one part of the monosodium phosphate solution to produce a mixed solution in which the constituents are in the ratio of two molecules of disodium phosphate to one molecule of monosodium phosphate, spray drying said mixed solution and subsequently further heating the resultant dried material at a temperature in the range of about 350° C. to about 450° C. for a period of at least 15 minutes to convert it to sodium tripolyphosphate.

2. A process for the manufacture of polymeric sodium tripolyphosphate containing less than about 1% of sodium metaphosphates and less than 1% of sodium pyrophosphates, consisting in neutralising phosphoric acid with soda ash to produce monosodium phosphate, filtering the liquid mixture to remove impurities, dividing the filtrate into a larger and a smaller part substantially in the ratio of 2 parts of the filtrate to the larger part to 1 part of the filtrate to the smaller part, neutralising the larger part of the filtrate to form disodium phosphate, mixing the disodium phosphate solution with the remaining one part of the monosodium phosphate solution to produce a mixed solution in which the constituents are in the ratio of two molecules of disodium phosphate to one molecule of monosodium phosphate, spray drying said mixed solution and heating the resultant dried material in a separate kiln at a temperature in the range of about 350° C. to about 450° C. for a period of at least 15 minutes to convert it to sodium tripolyphosphate, and cooling and grinding the final product.

3. A process for the manufacture of polymeric sodium tripolyphosphate containing less than about 1% of sodium metaphosphates and less than 1% of sodium pyrophosphates, consisting in neutralising phosphoric acid with soda ash to produce monosodium phosphate, filtering the liquid mixture to remove impurities, dividing the filtrate into a larger and a smaller part substantially in the ratio of 2 parts of the filtrate to the larger part and 1 part of the filtrate to the smaller part, neutralising the larger part of the filtrate with caustic soda to form disodium phosphate, mixing the disodium phosphate solution with the remaining one part of the monosodium solution to produce a mixed solution in which the constituents are in the ratio of two molecules of disodium to one molecule of monosodium phosphate, spray drying said mixed solution and as a further step heating the resultant dried material in a separate vessel at a temperature in the range of about 350° C. to about 450° C. for a period of at least 15 minutes to convert it to sodium tripolyphosphate and cooling the final product.

4. A process for the manufacture of polymeric sodium tripolyphosphate containing less than about 1% of sodium metaphosphates and less than 1% of sodium pyrophosphates, consisting in neutralising phosphoric acid to produce monosodium phosphate, dividing the monosodium phosphate solution into a large and a smaller part substantially in the ratio of 2 parts of the solution to the larger part to 1 part of the solution to the smaller part, neutralising the larger part of the solution to form disodium phosphate, mixing said disodium phosphate solution with the remaining one part of the solution to produce a mixed solution in which the constituents are in the ratio of two molecules of disodium phosphate to one molecule of monosodium phosphate, spray-drying said mixed solution by spraying the said solution into a stream of hot gas at an initial temperature of about 450° C., heating the resultant dried material in a separate vessel, heated by a stream of hot gases at a temperature in the range of about 350° C. to about 450° C. whilst agitating said material and recycling the said hot gases with any entrained sodium tripolyphosphate by mixing the same with the stream of hot gases used for spray drying said mixed solution.

5. A process for the manufacture of polymeric sodium tripolyphosphate containing less than about 1% of sodium metaphosphates and less than 1% of sodium pyrophosphates, consisting in neutralising phosphoric acid to produce monosodium phosphate, dividing the monosodium phosphate solution into a larger and a smaller part substantially in the ratio of 2 parts of the solution to the larger part and 1 part of the solution to the smaller part, neutralising the larger part of the solution to form disodium phosphate, mixing the disodium phosphate solution with the remaining one part of the monosodium phosphate solution to produce a mixed solution in which the constituents are in the ratio of two molecules of disodium phosphate to one molecule of monosodium phosphate, spray drying said mixed solution by contact with hot gases at a temperature of approximately 450° C. converting the resultant dried material to sodium tripolyphosphate in a separate kiln by heating and agitating said dried material in a separate vessel, heated by a stream of hot gases at a temperature of between 850° C. and 450° C. and recycling the said stream of hot gases after use in heating the dried material by mixing the same with hot gases used for the spray drying of said solution.

References Cited in the file of this patent
UNITED STATES PATENTS

| | | |
|---|---|---|
| 2,021,012 | McCullough | Nov. 12, 1935 |
| 2,109,811 | Welter | Mar. 1, 1938 |
| 2,162,657 | Wehrstein | June 13, 1939 |
| 2,174,614 | Borenemann | Oct. 3, 1939 |
| 2,390,400 | Taylor | Dec. 4, 1945 |
| 2,419,147 | King | Apr. 15, 1947 |

FOREIGN PATENTS

| | | |
|---|---|---|
| 495,192 | Great Britain | Nov. 9, 1937 |